(No Model.) 2 Sheets—Sheet 1.

G. W. COCHRAN.
SECONDARY BATTERY.

No. 434,376. Patented Aug. 12, 1890.

WITNESSES:
M. Agnes Cochran
Jane Franklin

INVENTOR
Geo. Whiteman Cochran (No Model.) 2 Sheets—Sheet 2.

G. W. COCHRAN.
SECONDARY BATTERY.

No. 434,376. Patented Aug. 12, 1890.

WITNESSES:
Donn Twitchell
C. Sedgwick

INVENTOR:
G. W. Cochran
BY Munn & Co.
ATTORNEYS

UNITED STATES PATENT OFFICE.

GEORGE WHITEMAN COCHRAN, OF NEW YORK, N. Y., ASSIGNOR OF ONE-HALF TO BENJAMIN FRANKLIN, OF SAME PLACE.

SECONDARY BATTERY.

SPECIFICATION forming part of Letters Patent No. 434,376, dated August 12, 1890.

Application filed December 14, 1889. Serial No. 333,771. (No model.)

*To all whom it may concern:*

Be it known that I, GEORGE WHITEMAN COCHRAN, of New York city, in the county and State of New York, have invented a new and Improved Secondary Battery, of which the following is a specification, reference being had to the annexed drawings, forming a part thereof, in which—

Figure 1:
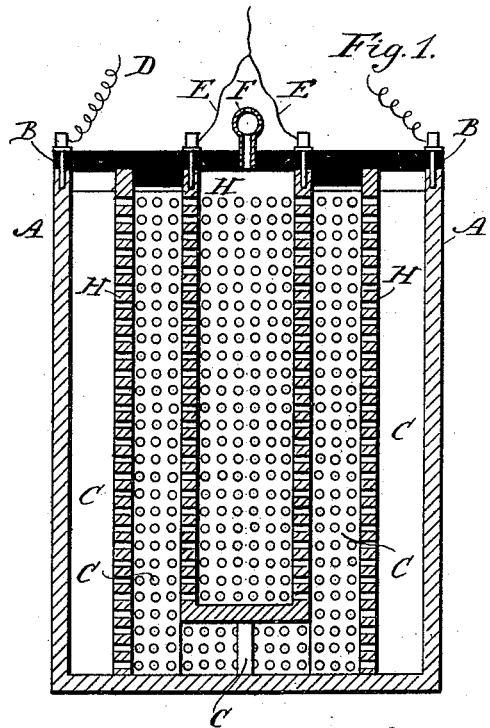
Figure 2:
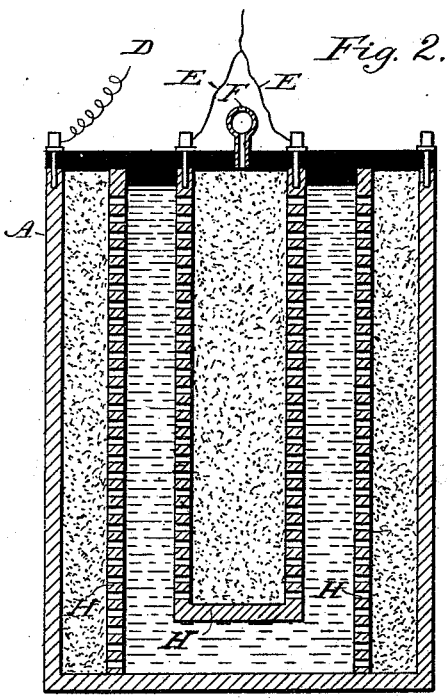
Figure 3:
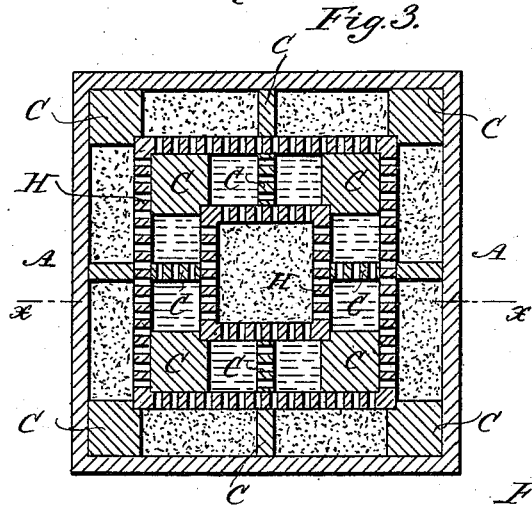
Figure 4:
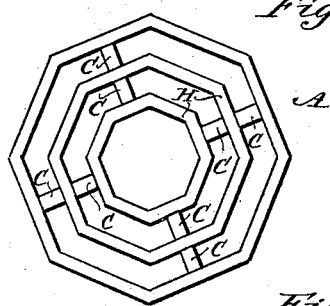
Figure 5:
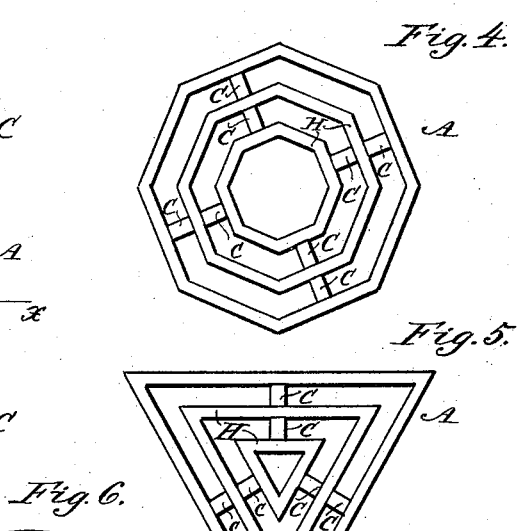
Figure 6:
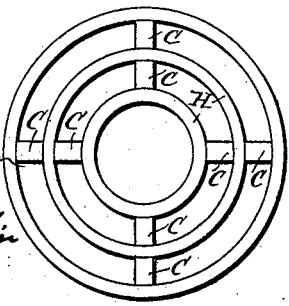
Figure 7:
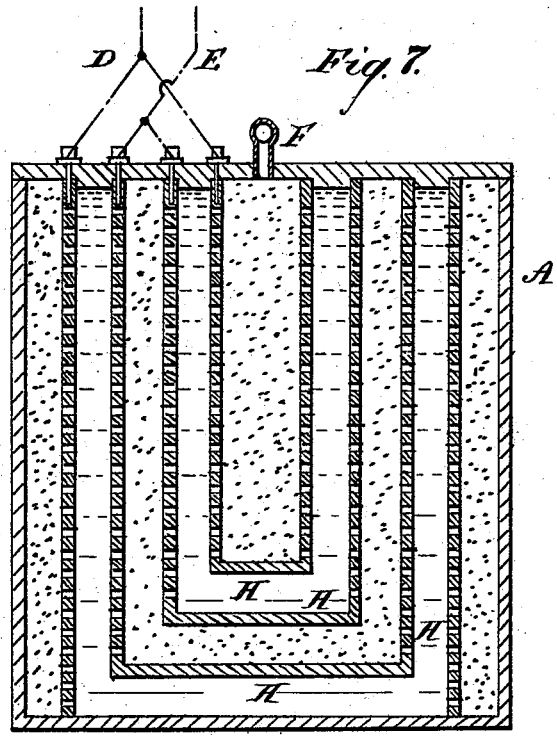
Figure 8:
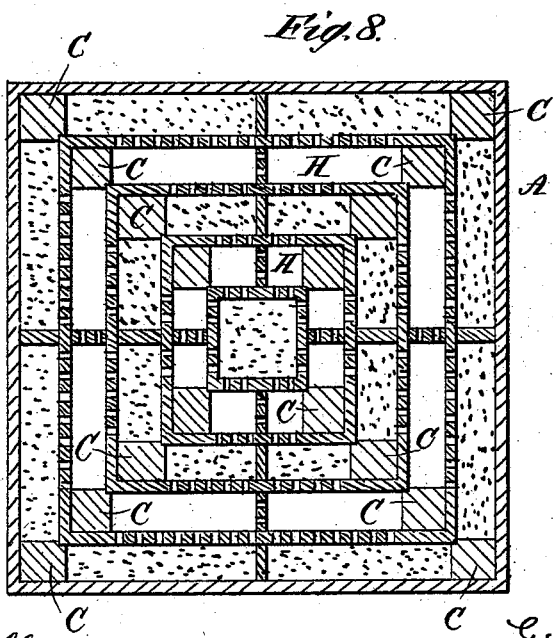

Figure 1 is a vertical transverse section of the jar and perforated cells of my improved secondary battery. Fig. 2 is a vertical transverse section showing the active material and electrolytic liquid. Fig. 3 is a horizontal section of the same. Figs. 4, 5, and 6 show different shapes of my improved battery. Fig. 7 is a vertical transverse section of a series of cells closed at the bottom and placed one within the other, and Fig. 8 is a horizontal section of the same.

Similar letters of reference indicate corresponding parts in all the views.

The object of my invention is to construct a secondary battery in which the defects inherent in other forms of secondary battery will be avoided.

My invention consists in a cell formed of a series of concentric chambers having perforated walls and adapted to contain the active material. It also further consists in the combination, with the concentric cells, of perforated spacing blocks or bars of insulating material placed between the walls of the cells to hold the parts in their relative positions.

In the jar A are placed perforated cells H, which are formed of a metal insoluble in the electrolytic liquid. The outer cell H is made rectangular in form, and of less width and length than the jar A, so as to leave a space between it and the jar for the reception of the active material. This cell in the present case is open at the bottom. Communication between the spaces on opposite sides of the walls of the cell is prevented by the contact of the lower edge of the cell-walls with the bottom of the jar A; but I do not confine myself to this construction.

To the corners and sides of the outer cell H are attached spacing-bars C, which hold the cell in a central position in the jar A. In the outer cell H is placed a similar perforated cell H, which is of smaller dimensions and is closed at the bottom. The inner cell H is supported a short distance from the bottom of the jar A by perforated corner and side spacing-bars C, which project below the bottom of the cell. The spacing-bars C are formed of insulating material—such as hard rubber—and serve to hold the cells H in position in the jar A.

The perforated cell is filled with active material. The spaces outside of the outer cell and within the inner cell are filled with red lead, and the remaining spaces between and around and within the cells are filled with the electrolytic liquid, which is a mixture of sulphuric acid and water; but I do not confine myself to these materials. These perforated cells, of which there can be any desired number, are provided with binding-screws for receiving the leads D E. The cover B, which is applied to the jar A, is furnished with apertures for the binding-screws, and with projections on its under surface which project into the space between the cells and serve to hold the cells in position. A tube F is inserted in the cover B for the escape of gas. This tube is enlarged near its upper end to accumulate any liquid that may be thrown up in the operation of charging and return it to the jar.

I have described my improvement as applied to a rectangular battery; but it may with equal facility be applied to batteries of octagonal, triangular, or circular shape, as indicated in Figs. 4, 5, and 6.

It will be observed that with my improvement a large amount of active material may be used without danger of displacement, short-circuiting, or the buckling of the plates or cells.

Having thus described my invention, I claim as new and desire to secure by Letters Patent—

1. A secondary battery consisting of a jar, a series of perforated cells closed at the bottom and placed one within the other within the jar and arranged to form chambers for the active material, the electrolytic liquid, and active material placed within the chambers formed by the perforated cells and in contact with the perforated cells, the cells alternating in position, as herein specified.

2. Elements for a secondary accumulator or storage-battery, consisting of a series of perforated cells closed at the bottom and arranged one within the other, and loose active material—such as red lead—held in place by the walls of the perforated cells, substantially as specified.

3. The combination, with the perforated cells, of perforated insulating-bars located between the perforated cells for holding the said cells in the position of use, substantially as specified.

4. The combination, with a battery-jar, of a series of cells placed within the battery-jar and arranged one within the other and a cover provided with ribs adapted to fit between the jar and the outer cell and between the cells of the series contained by the battery-jar, substantially as specified.

GEORGE WHITEMAN COCHRAN.

Witnesses:
M. AGNES COCHRAN,
JANE FRANKLIN.